United States Patent
Biddiscombe

(10) Patent No.: US 6,306,490 B1
(45) Date of Patent: *Oct. 23, 2001

(54) POLYMERIC FILMS

(75) Inventor: Helen Ann Biddiscombe, North Petherton (GB)

(73) Assignee: Trespaphan GmbH, Neunkirchen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,292

(22) Filed: Jan. 16, 1998

(30) Foreign Application Priority Data

Feb. 8, 1997 (GB) .................................................. 9702600

(51) Int. Cl.⁷ .............................. B32B 27/32; C08J 5/18; B41M 5/40
(52) U.S. Cl. .................. 428/315.5; 428/349; 428/315.7; 428/315.9; 428/317.9; 428/516; 428/517
(58) Field of Search .............................. 428/315.5, 315.7, 428/315.9, 317.3, 317.9, 349, 516, 517

(56) References Cited

U.S. PATENT DOCUMENTS

| 4,377,616 | 3/1983 | Ashcraft et al. ..................... 428/213 |
|---|---|---|
| 4,560,614 | 12/1985 | Park .................................. 428/317.9 |
| 4,734,324 | * 3/1988 | Hill .................................. 428/317.3 |
| 4,780,364 | * 10/1988 | Wade et al. ...................... 428/315.5 |
| 5,091,236 | 2/1992 | Keller et al. ......................... 428/213 |
| 5,178,942 | 1/1993 | Frognet et al. ................... 428/317.9 |
| 5,233,924 | * 8/1993 | Ohba et al. ....................... 428/315.5 |
| 5,342,684 | * 8/1994 | Carespodi ......................... 428/315.7 |
| 5,527,601 | * 6/1996 | Crighton et al. .................. 428/316.6 |

FOREIGN PATENT DOCUMENTS

| 0 367 613 | 5/1990 | (EP) . |
|---|---|---|
| 0 551 894 A1 | 7/1993 | (EP) . |
| 0 664 223 A1 | 7/1995 | (EP) . |
| 0 671 281 A1 | 9/1995 | (EP) . |
| 0 685 331 A1 | 12/1995 | (EP) . |
| 0 722 844 A1 | 7/1996 | (EP) . |
| 2 262 062 | 6/1993 | (GB) ............................. B32B/27/32 |
| 2 279 904 | 1/1995 | (GB) ............................. B32B/5/18 |
| WO 93/04860 | 3/1993 | (WO) ............................. B32B/27/18 |

* cited by examiner

*Primary Examiner*—Daniel Zirker
(74) *Attorney, Agent, or Firm*—Bacon & Thomas

(57) ABSTRACT

Biaxially oriented polymeric films having a core layer of a voided propylene homopolymer with a density of not more than 0.70 g/cm³, and at least one substantially non-voided layer on each surface of the core layer, the ratio of the combined thicknesses of the non-voided layers on the respective surfaces of the core layer being from 2:1 to 1:1. Films in accordance with the present invention have low curl, particularly after having been printed.

8 Claims, No Drawings

POLYMERIC FILMS

FIELD OF THE INVENTION

This invention concerns polymeric films and more particularly polymeric films having voided core layers.

BACKGROUND OF THE INVENTION

Polymeric films having voided core layers typically consist of a core layer of a voided propylene homopolymer with one or more non-voided layers on each surface of the core layer. Such films have found wide acceptance as packaging materials and as label stock, for example for self-adhesive labels and labels which are to be applied to articles by methods such as in-mold labelling.

In general, voiding of the core layer of such films makes them opaque, which in itself can be a desirable property for many end uses such as labelling, and it increases the yield of film from a given amount of propylene homopolymer since a significant proportion of the core layer consists of vacuoles which are formed during the voiding process. Significant reductions in film density can therefore be achieved compared with that calculated from the materials used to form the films.

As with other polymeric films, end uses for polymeric films having voided core layers often include printing of one of their outer surfaces. However, it has been found that doing so can result in curling of the film. Whilst this may not lead to problems with films which are to be used for packaging by so-called form-fill-sealing, it can lead to serious problems with films which are to be used for labelling. This can be especially so with films which are to be used for in-mold labelling where individual labels are held within a mold and against a surface of the mold whilst an article is formed within the mold and the label is thereby incorporated into the surface of the article. Curling leads to label fold and/or the label failing to be correctly incorporated into the articles, e.g. containers lids and other surfaces.

SUMMARY OF THE INVENTION

According to the present invention there are provided biaxially oriented polymeric films comprising a core layer of a voided propylene homopolymer having a density of not more than 0.70 g/cm$^3$, and at least one substantially non-voided layer on each surface of the core layer, the ratio of the combined thicknesses of the non-voided layers on the respective surfaces of the core layer being from 2:1 to 1:1.

DETAILED DESCRIPTION OF THE INVENTION

Curling is a particular problem with polymeric films with voided cores having densities of less than 0.70 g/cm$^3$, and especially so with relatively thick films such as are often used for labelling. However, by controlling the relative thicknesses of the non-voided layers on either side of the core layer, curling after printing can be brought within acceptable limits for end uses such as in mold labelling.

In general, as the density of the voided core layer of prior art voided films decreases as a result of increased voiding, the problem with curling tends to increase. However, by controlling the relative thicknesses of the layers on either side of the core layer in accordance with the present invention significant reductions in the tendency to curl can be achieved after the films have been printed. For example, films in accordance with the present invention can have cores with densities of less than 0.70 g/cm$^3$, preferably less than 0.60 g/cm$^3$, more particularly less than 0.55 g/cm$^3$, and especially less than 0.50 g/cm$^3$ and even lower, for example less than 0.48 g/cm$^3$.

Although the ratio of the combined thicknesses of non-voided layers on the respective surfaces of the voided core layer should be in the range of from 2:1 to 1:1, it is preferably from 1.8:1 to 1:1, more preferably from 1.6:1 to 1:1, especially from 1.5:1 to 1:1, and more especially from 1.2:1 to 1:1.

Films in accordance with the present invention can be of a variety of overall thicknesses. However, the benefits of the present invention tend to become particularly beneficial with films which are at least 30 μm thick, and more particularly with films which are at least 50 μm thick. Although films with a thickness of 50μm and more can be used as packaging materials, they are often used as labels, for example as self-adhesive labels when a suitable adhesive has been applied or as in-mold labels.

The thicknesses of the non-voided layers on the core layer can also be varied within wide limits, but it is generally preferred that the total thickness of the non-voided layer or layers on one side of the core layer is at least 3.0 μm. Thicker layers can be used, but as will be appreciated this generally leads to an increased film density due to the voided core layer representing a relatively smaller proportion of the film thickness. Reductions in core density can be effected to maintain overall film density, but this may not be possible if the voided core layers represents only a small proportion of the overall film thickness.

The voided core layer is formed from a propylene homopolymer, which for the purposes of the present invention include polymers containing small amounts of other alpha-olefins, for example up to 2 wt % of ethylene, which have had voids or vacuoles formed therein. Materials and methods which can be used to form the voided structure of the core layer of films of the present invention are well known in the polyolefin film art, suitable materials for the purpose including organic or inorganic particulates with a mean particle size in the range of from 1.0 to 10 μm. Particular examples of materials which can be used to effect voiding include polyamides, such as nylons, polyesters, e.g. polyethylene terephthalate and polybutylene terephthalate, and chalk.

The various non-voided layers on the voided core layer can in general be selected as desired for the particular end use of the films. They are preferably formed from polyolefins, including blends of polyolefins, and they can be formed from homopolymers, e.g. polyethylene or polypropylene, or copolymers, including terpolymers, containing units derived from two or more polyolefins. Examples of copolymers which can be used include those derived from a major amount of propylene and relatively minor amounts of ethylene and/or butene-1. If desired, at least one outer layer can be of a polar polymer, for example an ethylene/vinyl acetate copolymer, to improve the printability of the films.

Although a single non-voided layer can be present on each surface of the voided core layer, more than one layer can be used. More particularly, it is particularly preferred to use an intermediate layer of a relatively inexpensive polymer such as a propylene homopolymer beneath an outer layer of a relatively expensive copolymer which is used to impart heat seal properties and/or printability to the films, and this enables the total thickness of the non-voided layers on a particular side of the core layer to be increased to a value which serves to assist in reducing the curl of the films.

Although only the core layer of films of the present invention should be voided, the other layers of films of the present invention can include additives provided they don't lead to substantial voiding. For example, one or more of such layers can include a pigment, e.g. sub-micronic titanium dioxide, and they can, if desired, contain one or more additives proposed hitherto in the polyolefin film art, for example antiblock agents, antistatic agents, and slip agents. Examples of antiblock agents which can be used include silica and calcium carbonate. Slip agents which can be used can be migratory and non-migratory, for example fatty acid amides, e.g. erucamide, particulate polyamides, e.g. nylons, and particulate silicone elastomers. As will also be appreciated, the core layer can also contain pigments and/or other additives.

Films in accordance with the present invention can be produced by known methods. However, it is particularly preferred to coextrude melts of the respective polymers plus additives through a slot die and then after cooling to stretch the resulting polymer web sequentially, first in the direction of extrusion and then in the transverse direction.

Since the present invention is of particular value in reducing the curl of films which are to be used in printed form, they will usually be treated to improve their printability, for example by corona discharge or flame treatment.

The following Examples are given by way of illustration only.

In the various Examples film curl was tested by placing the film on a flat surface and making two perpendicular intersecting cuts in a sample of the film, the cuts being at 45° to the machine direction of the film, with each bisecting the other. By positioning the cuts in this manner, curl can be assessed in both the machine and transverse directions, the degree of curl being assessed by measuring the height by which the various points formed by the cuts rise from the flat surface. If the points formed by the intersection of the cuts which point in or opposite to the machine direction of the film curl, machine direction curl is indicated. If the points formed by the intersection of the cuts which point in the transverse direction of the film curl, transverse direction curl is indicated.

The film sample is then turned over and the film is again laid flat. The degree of curl in the machine and transverse directions can then be assessed as described above.

EXAMPLE 1

A five layer polymer web was produced by coextruding through a slot die melts of a propylene homopolymer containing 15.0 wt % of chalk with a mean particle size of 3 μm which formed the core layer of the web, intermediate layers of the propylene homopolymer on either side of the chalk containing layer but without chalk, and two outer layers, one consisting of a propylene/ethylene copolymer including 15 wt % of sub-micronic titanium dioxide, and the other consisting of a blend of a 67.5 wt % of a propylene/ethylene copolymer (4 wt % ethylene) and 32.5 wt % of a polyethylene.

The five layer web was chilled using a chill roll and it was then sequentially stretched, first 5:1 times in the direction of extrusion by passing it over heated rollers which had different peripheral speeds, and then 9.5:1 times in the transverse direction using a stenter oven, the biaxial stretching resulting in the core layer becoming voided.

The biaxially oriented film was cooled, subjected to corona discharge treatment on both surfaces, and them wound up.

The film had a total thickness of 75 μm with the core layer being 66.5 μm thick. The intermediate layer beneath the layer containing the titanium dioxide was 3.0 μm thick, the polyethylene layer being 1.5 μm thick. The other intermediate layer was 2.0 μm thick, and the outer layer on this intermediate layer was 2.0 μm thick.

The density of the core layer was 0.50 g/cm$^3$, and the ratio of thicknesses of the non-voided layers on the two surfaces of the core layer was 1.125.

One surface of the film was then printed using a heavy ink coverage. The degree of curl assessed using the curl test method described above was zero.

EXAMPLE 2

A five layer biaxially oriented film was produced as described in Example 1 but with 16 wt % of chalk in the core layer, the polyethylene layer being replaced by a propylene/ethylene copolymer and the relative thicknesses of the respective layers being slightly changed.

The resulting biaxially oriented film had a core layer which was 64 μm thick with a density of 0.47 g/cm$^3$, the intermediate layer beneath the outer layer of an unfilled propylene/ethylene copolymer containing 7.2 wt % of sub-micronic titanium dioxide was 6.0 μm thick and the layer of the unfilled propylene/ethylene copolymer was 1.0 μm thick. The relative ratio of the combined thicknesses of non-voided layers on the voided core layer was 1.75:1.

After printing as in Example 1 this film showed no curl in the curl test described above.

EXAMPLE 3

A five layer film was produced as described in Example 2 except that the two intermediate layers were both 6.0 μm thick and the two outer layers were both 1.0 μm thick, the core layer being 61 μm thick. The overall film thickness was again 75 μm thick.

The density of the core layer was 0.49 g/cm$^3$, and the ratio of the respective combined thicknesses of the non-voided layers on either side of the core layer was 1:1.

The film was printed as described in Example 1, following which it exhibited zero curl in the curl test.

EXAMPLE 4

A four layer biaxially oriented film was produced by a method similar to that described in Example 1 for a five layer film, but without an intermediate layer between the core layer and one of the outer layers. This single layer consisted of the blend of polymers used for one of the outer layers of the film produced in Example 2. On the other surface of the core layer was an intermediate layer consisting of a blend of 92.8 wt % of a propylene homopolymer and 7.2 wt % of sub-micronic titanium dioxide.

The voided core layer of the biaxially oriented film was 64 μm thick (density 0.50 g/cm$^3$), and the single outer layer on one side of the core layer was 4.0 μm thick. The intermediate layer on the other surface of the core layer was 6 μm thick and the outer layer on this layer was 1.0 μm thick. The ratio of thicknesses of the layers on the two surfaces of the core layer was 1.75:1.

The film was printed as described in Example 1, following which it exhibited zero curl in the curl test.

EXAMPLE 5 (comparison)

A four layer polymeric web consisting of a core layer of propylene homopolymer containing 8.5 wt % of chalk (mean particle size 3 μm) with an intermediate layer of a propylene homopolymer containing 10.8 wt % of titanium dioxide and an outer layer of a propylene/ethylene copolymer (4 wt % ethylene) on one surface and a blend of 67.5 wt % of the same copolymer on the other surface with 32.5 wt % of polyethylene was produced in a similar manner to that described for the five layer web in Example 1 and then sequentially stretched to form a biaxially oriented film which was 80 μm thick. The core layer was 67 μm thick (density 0.56 g/cm$^3$), the outer layer consisting of the copolymer was 1.0 μm thick, with the intermediate layer being 8 μm thick, and the other layer formed from the polymer blend was 4 μm thick. The ratio of thicknesses of the two non-voided outer layers on the voided core layer was 2.25:1.

After corona treatment and printing on surface in a manner similar to that used for the film of Example 1 the film showed a curl towards the printed face of 6 to 10 mm in both the machine and transverse directions under substantially similar conditions.

What is claimed:

1. A biaxially oriented co-extruded polymeric film which consists of a plurality of co-extruded layers, an optional adhesive layer applied to one surface of said co-extruded biaxially oriented film and optional printing on an exposed surface of said film; said co-extruded layers including a core layer of a voided propylene homopolymer which has a density of not more than 0.70 g/cm$^3$, at least one substantially nonvoided layer of polyolefin co-extruded onto a first side of said core layer, and at least one substantially non-voided layer of polyolefin co-extruded onto a second side of said core layer; with the proviso that the ratio of the combined thickness of the non-voided layers on the respective surfaces of the core layer is from 2:1 to 1:1.

2. The film of claim 1 which includes printing on an exposed surface thereof.

3. The film of claim 2 which includes an adhesive layer on one surface and printing on said exposed surface.

4. The film of claim 1 wherein there are two or more substantially non-voided layers of polyolefin on each surface of said core layer whereby said film has at least five co-extruded layers.

5. The film of claim 4 wherein there are two substantially non-voided layers of polyolefin on each surface of said core layer whereby said film has exactly five co-extruded layers.

6. The film of claim 1 wherein said voided polypropylene homopolymer has a density which is not more than 0.60 g/cm$^3$.

7. The film of claim 1 wherein the ratio of the combined thickness of the non-voided layers on the respective surfaces of the core layer is from 1.6:1 to 1:1.

8. A label made out of the film of claim 1.

* * * * *